United States Patent [19]

Modan

[11] 3,969,320

[45] *July 13, 1976

[54] RECOVERY OF RESINOUS COMPOSITIONS CONSISTING OF, AND INCLUDING, POLYPHENYLENE ETHERS IN PARTICULATE FORM FROM LIQUID MEDIA

[75] Inventor: Michael M. Modan, Albany, N.Y.

[73] Assignee: General Electric Company, Pittsfield, Mass.

[ * ] Notice: The portion of the term of this patent subsequent to Dec. 28, 1988, has been disclaimed.

[22] Filed: Dec. 4, 1972

[21] Appl. No.: 311,820

[52] U.S. Cl. ............................ 260/47 ET; 260/96 R; 260/874; 260/886; 526/12; 526/346
[51] Int. Cl.² ................ C08G 65/34; C08G 65/44; C08G 65/46
[58] Field of Search ............. 260/47 ET, 96 R, 874, 260/886, 93.5 A

[56] References Cited
UNITED STATES PATENTS
3,630,995 12/1971 Modan .................................. 260/47

*Primary Examiner*—Lester L. Lee
*Attorney, Agent, or Firm*—William F. Mufatti; Edward A. Hedman; Rocco S. Barrese

[57] ABSTRACT

A method is provided for the recovery of particulate resinous compositions, consisting of, and including polyphenylene ethers in emulsions, solutions, suspensions or emulsion solution combinations in a liquid medium having a component which vaporizes readily. The method comprises atomizing the resinous composition and the liquid medium into a closed chamber into contact with a hot stream of inert gas or the superheated, vaporized component, allowing the gas or superheated, vaporized component to interact with the atomized droplets to remove the liquid component which vaporizes readily therefrom, and collecting the particulate resinous composition produced thereby.

19 Claims, 1 Drawing Figure

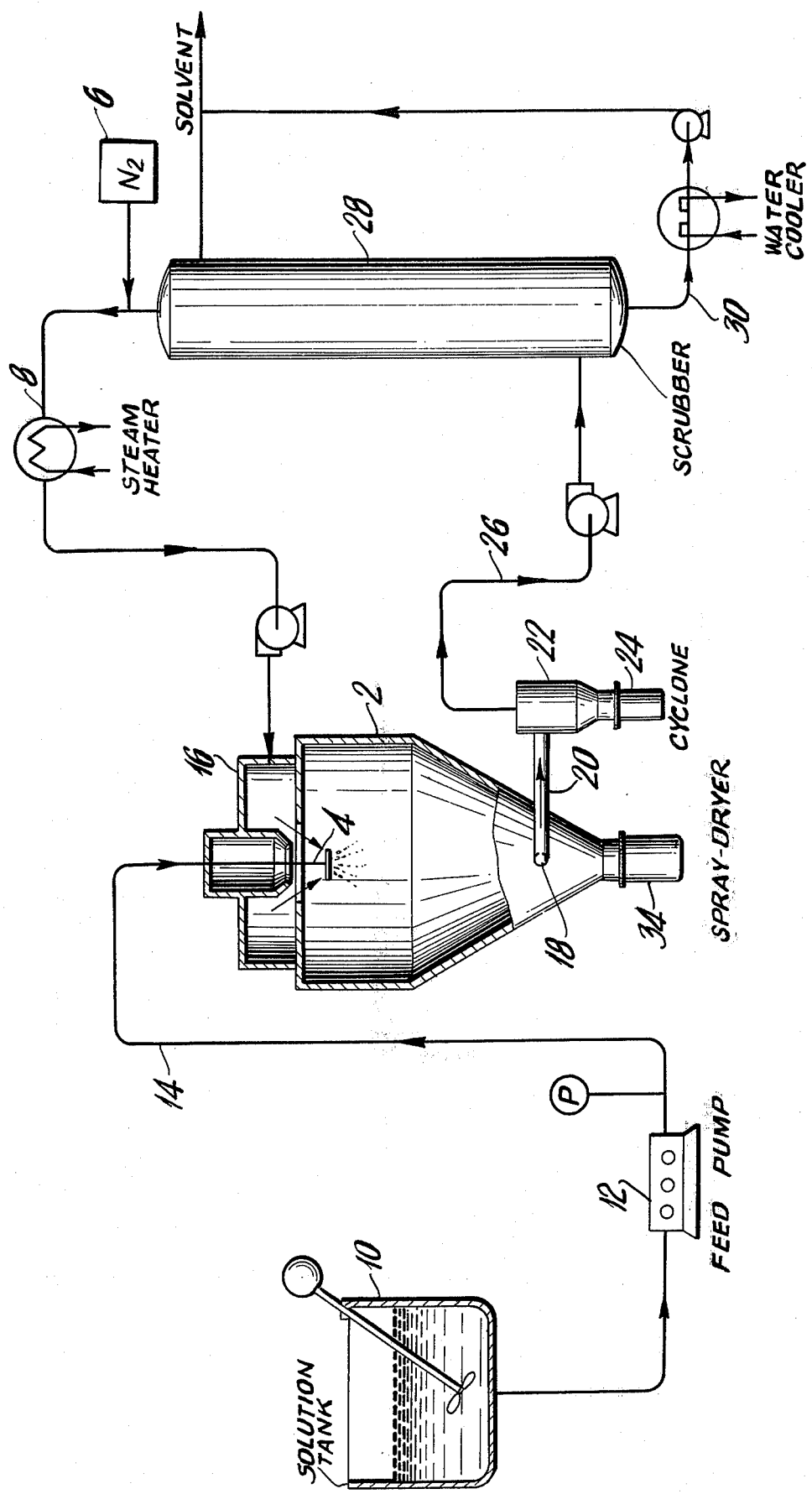

RECOVERY OF RESINOUS COMPOSITIONS CONSISTING OF, AND INCLUDING, POLYPHENYLENE ETHERS IN PARTICULATE FORM FROM LIQUID MEDIA

This invention relates to synthetic resins formed from phenols, and more particularly, to separation and recovery of resinous compositions consisting of, and including, polyphenylene ethers in particulate form from liquid media used in their manufacture.

BACKGROUND OF THE INVENTION

The term "polyphenylene ethers" includes a family of polymers well known to those skilled in the art, and they are made by a variety of catalytic and noncatalytic processes from the corresponding phenols or reactive derivatives thereof. By way of illustration, certain of the polyphenylene ethers are disclosed in Hay, U.S. Pat. Nos. 3,306,874 and 3,306,875, and in Stamatoff, U.S. Pat. Nos. 3,257,357 and 3,257,358. In the Hay patents, the polyphenylene ethers are prepared by an oxidative coupling reaction comprising passing an oxygen-containing gas through a reaction solution of a phenol and a metal-amine complex catalyst. Other disclosures relating to processes using metal-amine catalysts are found in Bussink et al., U.S. Pat. No. 3,337,499, Blenchard et al., U.S. Pat. No. 3,219,626; Laakso et al., U.S. Pat. No. 3,342,892; Borman, U.S. Pat. No. 3,344,116; Hori et al., U.S. Pat. No. 3,384,619; Faurote et al., U.S. Pat. No. 3,440,217; and processes relating to metal based catalysts which do not include amines, are known from disclosures such as Wieden et al., U.S. Pat. No. 3,442,885 (copper-amidines); Nakashio et al., U.S. Pat. No. 3,573,257 (metal-alcoholate or -phenolate); Kobayashi et al., U.S. Pat. No. 3,455,880 (cobalt chelates); and the like. In the Stamatoff patents, the polyphenylene ethers are produced by reacting the corresponding phenolate ion with an initiator, such as a peroxy acid salt, an acid peroxide, a hypohalite, and the like, in the presence of a complexing agent. Disclosures relating to non-catalytic processes, such as oxidation with lead dioxide, silver oxide, etc., are described in Price et al., U.S. Pat. No. 3,382,212. All of the above-mentioned disclosures are incorporated herein by reference.

The term "resinous compositions" in its broadest sense includes various copolymers and blends of the polyphenylene ethers formed by interpolymerization with other monomers or polymers, such as the polyolefins, polystyrenes, polycarbonates and the like, wherein the polyphenylene ether component is present in an amount of, for example, from 1 to 99 parts by weight per 100 parts by weight of the total resinous components of the composition.

The compositions including a polyphenylene ether component can be chemically and physically combined and they can be in liquid media in the form of emulsions, solutions, suspension solution combinations, e.g., as disclosed in U. K. Patent No. 1,291,609, and the like.

Among the most important of such resinous compositions are blends of polyphenylene ethers with styrene resins, including rubber modified polystyrene resins, and graft copolymers of polyphenylene ether resins with styrene resin, including styrene homopolymer resins, and the like. These are described, for example, in Cizek, U.S. Pat. No. 3,383,435, which is incorporated herein by reference. Compositions of polyphenylene ether and polystyrene and of rubber modified polystyrene can also be prepared by the oxidation of the corresponding phenol, e.g., 2,6-dimethyl phenol, in a solution of polystyrene or of polystyrene and a rubber, see, for example, Katchman, U.S. Pat. No. 3,663,661, the disclosure of which is incorporated herein by reference. Reaction mixtures containing graft copolymers of polyphenylene ether resins and styrene resins can also be made by polymerization of vinyl aromatic monomers in the presence of polyphenylene ethers for example, according to the disclosure in Fox, Canadian Patent No. 785,834, which is incorporated herein by reference. A typical process disclosed in Fox involves blending equal parts of poly-2,6-dimethyl-1,4-phenylene oxide and styrene monomer and reacting the blend in the presence of about 1% by weight dicumyl peroxide, based on the styrene monomer.

In general, all of the above processes produce the polyphenylene ether or resinous composition as a component in a liquid medium and a common subsequent step is to add a polymer non-solvent to the liquid medium to precipitate the polymer. For example, if the resinous composition is contained in a medium which includes benzene, toluene, xylene or the like, adding methanol will precipitate the polyphenylene ether. If the resinous composition is contained in pyridine, adding water will precipitate the composition.

Such procedures have disadvantages, including a high energy cost, the need to use complex equipment, a loss in yield due to the number of handling steps required, loss of economy through solvent and non-solvent evaporation and intermingling; and difficulty in controlling particle size distribution in the product.

It has now been discovered that the resinous composition consisting of or including a polyphenylene ether can be conveniently isolated directly from a liquid medium, if one of the liquid components vaporizes readily, by atomizing the resinous composition and liquid medium and removing the liquid component which vaporizes readily from the atomized droplets by contact with a hot inert gas or a superheated, vaporized form of the component which volatilizes readily. The polyphenylene ether, or compositions containing it, is then collected in the form of discrete, fine particles. The process is especially important in its application to polyphenylene ether reaction mixtures, after removal of the metal catalysts and treatment to remove colored impurities, if desired. Benzene and toluene are particularly suitable as the liquid component which vaporizes readily, but others, such as xylene, trichloroethylene and the like may be used.

The novel process has the following advantages over those described in the prior art: (i) lower energy cost; (ii) simpler equipment; and (iii) higher yields.

DESCRIPTION OF THE DRAWINGS

In the drawing is illustrated, in flow diagram form, an arrangement of process equipment adapted for carrying out the process of the present invention.

DESCRIPTION OF THE INVENTION

According to the present invention there is provided a process for recovering a resinous composition consisting of or including a polyphenylene ether resin from a liquid medium having a component which vaporizes readily, said process comprising atomizing the resinous composition and said liquid medium under pressure into an enclosed chamber and producing an atomized spray of fine droplets of the resinous composition and said liquid medium in said chamber, mixing the fine droplets in said chamber with a hot inert gas, a superheated vaporized form of said component, or a mixture thereof, and flashing off said component which vaporizes readily, thereby forming particles of said resinous composition and a vaporized mixture of said component which vaporizes readily and said inert gas or said superheated vaporized form of said component, removing said vaporized mixture from said chamber, and collecting the resinous composition in a discrete particulate form.

In an especially preferred feature of this invention, the polyphenylene ether will be produced by an oxidative coupling reaction in the presence of a metal-amine complex catalyst. The liquid medium will comprise a reaction solution capable of liquid-liquid extraction with an aqueous solution. The reaction will be terminated and the metal-amine catalyst residue separated from the reaction solution by contacting the reaction solution with an aqueous solution of mineral acid, organic acid, carbon dioxide or a mixture thereof. Then the so-treated aqueous solution-treated reaction solution will be treated according to this invention by atomization under pressure into an enclosed chamber and producing an atomized spray of fine droplets of the reaction solution in said chamber, mixing the fine droplets in said chamber with a hot inert gas or superheated, vaporized solvent or a mixture thereof and flashing off the solvent in the droplets to form solvent-free particles of said polyphenylene ether and a mixture of the solvent and said inert gas, removing said mixture of solvent and inert gas from the chamber, and collecting the polyphenylene ether in a discrete particulate form. Process details concerning the polymerization and termination steps are set forth in the Hay patents, and in Modan, U.S. Pat. No. 3,630,995 and copending, commonly assigned allowed application, Ser. No. 183,321, filed Sept. 24, 1971, now U.S. Pat. No. 3,783,147 the disclosures of which are incorporated herein by reference.

In general, the preferred polyphenylene ether resins will be of the formula

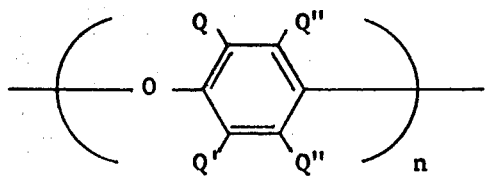

wherein Q is a monovalent substituent such as hydrogen, a hydrocarbon radical, a halohydrocarbon radical having at least two carbon atoms between the halogen atom and the phenol nucleus, hydrocarbonoxy radicals and halohydrocarbonoxy radicals having at least two carbon atoms between the halogen atom and the phenol nucleus, Q' and Q'' are the same as Q and in addition, halogen, with the proviso that Q, Q' and Q'' are all free of a tertiary alpha-carbon atom, and $n$ is a whole integer equal to at least 50.

With respect to resinous compositions which include a polyphenylene ether as one of the components, the other component is preferably a blended styrene resin or the composition can also comprise a grafted interpolymerization product, e.g., as can be obtained by co-extrusion of the polyphenylene ether resin and the styrene resin at elevated temperatures, e.g., from 450° to 550°F., or by one of the other techniques mentioned above.

The preferred styrene resin is one having at least 25% by weight of its polymer units derived from a vinyl aromatic compound of the formula:

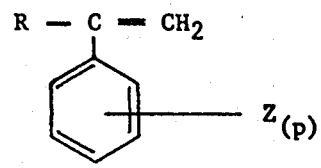

wherein R is hydrogen, (lower)-, e.g., $C_1$–$C_6$, alkyl or halogen; Z is vinyl, hydrogen chloride or (lower)alkyl; and $p$ is 0 or a whole number of from 1 to 5. The term "styrene resin" as used herein and in the appended claims, and as defined by the above-formula includes, illustratively, homopolymers, such as polystyrene and polychlorostyrene, the rubber modified polystyrenes, such as rubber modified high impact polystyrene, and the styrene containing copolymers, such as the styrene-acrylonitrile copolymers (SAN), styrene-butadiene copolymer, styrene-acrylonitrilebutadiene terpolymers (ABS), poly-α-methylstyrene, copolymers of ethylvinylbenzene and divinyl benzene and the like. The most preferred styrene resins are the styrene homopolymers and the rubber modified high impact polystyrenes.

The polymer composition and liquid medium is fed to an enclosed chamber, wherein it is atomized, e.g., with a pressure nozzle, two-fluid nozzle, centrifugal disc or similar means, into fine droplets. In the chamber is a hot, inert gas, such as nitrogen, argon, helium, and the like, or superheated volatilized liquid medium, such as vaporized benzene, toluene, trichloroethylene, and the like, or a mixture thereof, which mixes with the droplets to remove the readily volatilized component therefrom. Preferably the gas or superheated vapors are flowing, either co- or countercurrently to the flow of the atomized droplets. Preferably, the droplets will fall downwardly through the chamber, and the component which volatizes readily will flash off by evaporation, and form a volatilized mixture with the gas or superheated vapor. Thereupon the discrete particles of resinous composition consisting of, or including, polyphenylene ether resin will form and collect at the bottom of the chamber.

In preferred embodiments, the volatilized mixture including inert gas, on removal from the chamber, will be passed through a separator to remove very fine particles of resinous compositions, and then through a condenser and scrubber to recover and remove the evaporated component which volatilizes readily. In another preferred embodiment, the inert gas exhausted from the closed chamber will be reheated to the desired temperature and recirculated back into the chamber. The product can be further dried, if desired, then can be molded or otherwise formulated in known ways.

The component in the liquid medium which is readily vaporizable may be any of the liquid media with the recited characteristics described in the above-mentioned patents, but aromatic liquids such as benzene, toluene and xylene are preferred, as are halogenated aliphatic liquids, such as trichloroethylene, and the like.

According to the present invention, the resinous composition is substantially freed from liquid medium and produced in the form of discrete particles in a chamber which can comprise a large cylindrical, and usually vertical, vessel. For example, the polymer feed solution is introduced into the chamber through means to effect atomization thereof, such as a pressure nozzle, e.g., with hole diameter of 0.010 to 0.15 inch, a two-fluid nozzle, or a centrifugal disc, operating at a speed of, e.g., 3,000 to 50,000 r.p.m. With atomizers of the type described, the resinous composition and the liquid medium can be dispersed into droplets as small as 2 microns; the largest drop will be up to about 500 microns. The time required for removal of the readily volatilized liquid component from the droplets is generally very short and will be usually a fraction of a second.

Contacting with the hot inert gas may be co-current, mixed, or countercurrent with respect to the flow of gas and solids. The inert gas may be heated by steam, direct or indirect fired heaters and the inert gas temperatures may range from 300° to 1,500°F.

In the preferred chambers, (e.g., as shown in the drawing), inert gas flow is downward and co-current with the direction of the movement of the droplets and the course product settles and is removed separately from the bottom of the chamber. Those skilled in the art will realize that many varieties of gas flow patterns can be employed; most are intended primarily to produce turbulence and thorough mixing of gas and droplets and to achieve the most effective use of the chamber volume.

Referring to the drawing, polymer composition feed comprising, e.g., a reaction solution from a reactor (not shown) is placed in agitated holding tank 10 and transferred with pump 12 through conduit 14 into chamber 2. Introduction of polymer feed is through atomizer 4 which may be a pressure nozzle, centrifugal disc or the like, and this causes the feed to be broken up into a spray of atomized fine droplets which spread into the chamber. Located outside chamber 2 is inert gas storage vessel 6 which is connected to heated duct 8, terminating within the chamber in head 16. This is adapted to direct the gas downwardly therewithin. As the droplets pass downwardly, the hot gas stream (entrance temperature 300°–1500°F.) moves downwardly and mixes with them, causing the volatile liquid component to flash off and leave the droplets and mix with the gas. The major proportion of volatile liquid component and inert gas mixture leaves vessel 2 at exhaust port 18, moving through duct 20 into gas-solid separator 22 (e.g., a cyclone separator) in which very fine polymer particles, if present, are separated and then removed from time-to-time through valved port 24. The gas is then transferred through conduit 26 to scrubber 28 for removing the entrained solvent through conduit 30. The solvent can be sent to a recovery system (not shown) and the gas, which leaves through a conduit is exhausted or, in preferred embodiments, recycled, as shown. The discrete, solvent-free particles of resinous composition containing or including polyphenylene ether are collected at bottom 34 of chamber 2 and moved to a separator (not shown) for separation from any additional entrained gas and liquid. The particles are suitable for bagging, storage or for further formulation.

DESCRIPTION OF THE PREFERRED EMBODIMENTS

The following examples are added to illustrate but not to limit the scope of the invention. Unless otherwise stated, all parts are by weight.

EXAMPLE 1

1000 parts (volume) of a poly(2,6-dimethyl-1,4-phenylene)ether reaction solution in toluene containing 9% by weight of polymer and 2.34 parts per 100 parts of dibutylamine, copper ion and 15 parts of water is placed in a reaction tank. To this mixture is added 150 parts of water and 150 parts of acetic acid and the mixture is vigorously agitated for 10 minutes. The aqueous phase is separated, and contains substantially all of the dibutylamine and the copper. The polymer solution is assayed and is found to contain only a small amount of dibutylamine and substantially no copper.

The polymer solution is concentrated to about 17.3% solids content and is pumped to a chamber similar to that shown semischematically in the drawing. The polyphenylene ether suspension is warmed to about 32°C. and is atomized in the chamber. A stream of hot nitrogen (about 150°C.) is introduced at a rate of 500 kg./hour and directed to flow co-currently to the falling droplets and evaporates the toluene. Discrete particles of poly(2,6-dimethyl-1,4-phenylene)ether are formed as a free flowing powder and collected at the bottom of the chamber. The average particle size is 35–40 microns and the bulk density is about 36–44 g./cm$^3$ after drying in a vacuum oven for 2 hours at 100°C.

The gases exiting from the port near the bottom of the chamber are transferred to a cyclone separator and an additional fraction of particulate polyphenylene ether is recovered therefrom. This fraction has a bulk density of 0.39–0.48 g./cm$^3$ after drying in a vacuum oven at 100°C. for 2 hours. The nitrogen exiting from the cyclone is passed through a scrubber countercurrently against downflowing toluene, then is recycled, after re-heating, into the enclosed chamber.

EXAMPLE 2

The procedure of Example 1 is repeated, substituting a suspension of poly(2,6-dimethyl-1,4-phenylene)ether in toluene at 15% by weight of solids. The feed temperature is 17°C., and the temperature of the hot nitrogen is 150°C. at the chamber inlet (77°C. at the outlet). The product is obtained as a free flowing powder. The average particle size is 30–35 microns and the bulk density is 0.38–0.46 g./cm$^3$ after drying in a vacuum for 2 hours at 100°C.

EXAMPLE 3

The procedure of Example 1 is repeated, substituting a suspension of poly(2,6-dimethyl-1,4-phenylene)ether in toluene at 15% by weight of solids. The feed temperature is 18°C., and the temperature of the hot nitrogen is 176°C. at the chamber inlet. The rate of nitrogen flow is 900 kg./hr. and the feed is atomized into the chamber at the rate of 222 kg./hr. The product is obtained in discrete particulate form. The average particle size is 45–50 microns and the bulk density is 0.20–0.24 g./cm$^3$ after drying.

EXAMPLE 4

A solution of poly(2,6-dimethyl-1,4-phenylene)ether in toluene at 20% by weight solids content and at 15°C.

is fed to a chamber as in Example 1 through a 60° nozzle of 1.2 mm. orifice size, nozzle pressure of 40–60 atm. Nitrogen is fed co-currently at 580 kg./hr., heated to 150°C., measured at the inlet. The product is obtained as discrete particles, bulk density 0.25 to 0.29 g./cm³.

EXAMPLE 5

The procedure of Example 4 is repeated, substituting a twofluid nozzle for the single orifice nozzle and a suspension of polyphenylene ether at 10% by weight solids content. Particulate polyphenylene ether is obtained, having a bulk density of 0.24 to 0.30 g./cm³.

EXAMPLE 6

Into a three-necked flask equipped with a dropping funnel, thermometer, stirrer and oxygen inlet tube are added 3000 parts by volume of benzene solution containing 36 parts of polybutadiene (Solprene 203 of Phillips Petroleum Co.), 300 parts of polystyrene (Dylene 8 of Koppers Chemical Co.), 50.4 parts by volume of di-n-butylamine and 4.32 parts of cuprous bromide. Oxygen is passed through the stirred reaction mixture at the rate of 4 standard cubic feet per hour. A solution of 300 parts of 2,6-dimethyl phenol in 300 parts of benzene is added dropwise over a 20–30 min. interval while maintaining the temperature at 25–30°C. The reaction is continued for 120 minutes after completion of addition of 2,6-dimethyl phenol and terminated by the addition of 100 parts by volume of 50% aqueous acetic acid solution. The acid layer is removed by centrifugation. The polymer solution is pumped to a chamber similar to that shown semi-schematically in the drawing. The polyphenylene ether suspension is at about 25°C. and is atomized through a nozzle. A stream of hot nitrogen (150°C.) is introduced at a rate of 500 kg./hr. and is directed to flow co-currently to the falling droplets and evaporates the benzene. Discrete particles of a composition of poly(2,6-dimethyl-1,4-phenylene)ether, polystyrene and rubber are formed and collected at the bottom of the chamber.

EXAMPLE 7

The procedure of Example 6 is repeated substituting for the benzene, rubber and polystyrene, 3000 parts by volume to toluene containing 300 g. of rubber modified polystyrene (825 TV, Cosden Oil and Chemical Co.). After atomization into a chamber, co-currently with hot nitrogen according to this invention, a discrete, particulate polyphenylene ether composition containing rubber modified polystyrene is obtained.

EXAMPLE 8

A solution of 45 parts by weight of poly(2,6-dimethyl-1,4-phenylene)ether and 55 parts of styrene homopolymer (Dylene 8 from Koppers Chemical Co.) in 1600 parts by volume of toluene, is atomized into a chamber according to the procedure described in Example 1. A composition comprising polyphenylene ether and styrene homopolymer resin is obtained in discrete particulate form according to this invention.

EXAMPLE 9

Poly(2,6-dimethyl-1,4-phenylene)ether is dissolved in styrene monomer and the styrene monomer is polymerized by the procedure of Fox, Canadian Patent No. 785,834, to produce a graft copolymer of the polyphenylene ether and the polystyrene. More particularly, this process involves blending equal parts of poly-2,6-dimethyl-1,4-phenylene oxide and styrene monomer and reacting the blend at 140°C for 60 minutes in the presence of one percent by weight of dicumyl peroxide, based on the styrene monomer. Ten parts by weight of polymer is ground to a fine powder and dissolved in 90 parts by volume of benzene. The benzene solution is atomized into a chamber according to the procedure described in Example 1. A composition comprising a graft copolymer of polyphenylene ether and polystyrene is obtained in discrete particulate form according to this invention.

Typically, the particle size distribution of the resinous compositions obtained by the above-procedures is as follows:

| | U.S. Standard Sieve, mesh size | | | | | |
|---|---|---|---|---|---|---|
| | 20 | 30 | 100 | 200 | 325 | 400 |
| wt.%, retained on | 0.4 | 5.3 | 24.1 | 51.0 | 15.7 | 2.3 |

Bulk densities of the order of 0.35 g./cm³ are readily obtained.

Obviously, other modifications in this invention are possible in view of the above examples and the teachings herein. For example, instead of using benzene, toluene or xylene, the solvent for the feed can comprise trichloroethylene. Instead of nitrogen, argon, or superheated, volatilized benzene or toluene can be used in the chamber.

The invention in its broader aspects is not limited to the specification, methods, steps and improvements shown and described herein, but departures may be made within the scope of the accompanying claims without departing from the principles of the invention and without sacrificing its chief advantages.

I claim:

1. A process for recovering a resinous composition consisting of or including a polyphenylene ether resin from a liquid medium having a component which vaporizes readily, said process comprising introducing the resinous composition and said liquid medium into an enclosed chamber through means to effect the atomization thereof, said resinous composition and said liquid medium being at a temperature of from about 15°C to about 32°C, atomizing the resinous composition and said liquid medium under pressure into said enclosed chamber and producing an atomized spray of fine droplets of the resinous composition and said liquid medium in said chamber, mixing the fine droplets in said chamber with a hot inert gas, a superheated vaporized form of said component, or a mixture thereof, and flashing off said component which vaporizes readily, thereby forming particles of said resinous composition and a vaporized mixture of said component which vaporizes readily and said inert gas or said superheated vaporized form of said component, removing said vaporized mixture from said chamber, and collecting the resinous composition in a discrete particulate form.

2. A process as defined in claim 1 wherein said resinous composition comprises a polyphenylene ether, a blend of a polyphenylene ether and a styrene resin or a graft copolymer of a polyphenylene ether and a styrene resin.

3. A process as defined in claim 2 wherein said polyphenylene ether is poly(2,6-dimethyl-1,4-phenylene)ether.

4. A process as defined in claim 2 wherein said resinous composition comprises a polyphenylene ether, a blend of a polyphenylene ether and a styrene homopolymer resin or a graft copolymer of a polyphenylene ether with a styrene homopolymer resin.

5. A process as defined in claim 2 wherein said resinous composition comprises a polyphenylene ether, a blend of a polyphenylene ether and a rubber modified high impact polystyrene or a graft copolymer of a polyphenylene ether with a rubber modified high impact polystyrene.

6. A process as defined in claim 1 wherein the hot inert gas passes co-currently to the direction of flow of said droplets.

7. A process as defined in claim 1 wherein the resinous composition and liquid medium is introduced at the top of the chamber and the particles are removed from the bottom of the chamber.

8. A process as defined in claim 1 including the step of recovering the vaporized component from said volatilized mixture and heating and recycling the inert gas into said enclosed chamber.

9. A process as defined in claim 8 including the step of recovering fine particles of said resinous composition from said volatilized mixture before recycling said inert gas into said enclosed chamber.

10. In a process for forming a polyphenylene ether by an oxidative coupling reaction in the presence of a metal-amine complex catalyst comprising passing an oxygen-containing gas through a reaction solution of a phenol and said metal-amine catalyst in a reaction solvent, said reaction solution being capable of liquid-liquid extraction with an aqueous solution, and terminating the reaction and separating the metal-amine catalyst residue from the reaction solution by contacting the reaction solution with an aqueous solution of mineral acid, organic acid, carbon dioxide or a mixture thereof in a countercurrent liquid-liquid extraction column and then separating the aqueous solution, the improvement which comprises feeding the aqueous solution-treated reaction solution into an enclosed chamber through means to effect the atomization thereof, said aqueous solution treated reaction solution being at a temperature of from about 15°C to 32°C, atomizing the aqueous solution-treated reaction solution under pressure into said enclosed chamber and producing an atomized spray of fine droplets of the reaction solution in said chamber, mixing the fine droplets in said chamber with a hot inert gas, superheated vaporized solvent or a mixture thereof and flashing off the solvent in the droplets to form solvent-free particles of said polyphenylene ether and a vaporized mixture of the solvent and said inert gas, removing said vaporized mixture from the chamber, and collecting the polyphenylene ether in a discrete particulate form.

11. A process as defined in claim 10 wherein the reaction solution comprises a phenol, a metal-amine catalyst and an aromatic solvent.

12. A process as defined in claim 11 wherein the aromatic solvent is selected from the group consisting of benzene, toluene and xylene.

13. A process as defined in claim 10 wherein the inert gas is nitrogen.

14. A process as defined in claim 10 wherein the polyphenylene ether is poly(2,6-dimethyl-1,4-phenylene)ether having at least 50 repeating units.

15. A process as defined in claim 12 wherein the aqueous solution-treated reaction solution fed to the enclosed chamber comprises from about 5 to about 40% by weight of polyphenylene ether in benzene.

16. A process as defined in claim 12 wherein said aqueous solution-treated reaction solution fed to the enclosed chamber comprises from about 5 to about 40% by weight of polyphenylene ether in toluene.

17. A process as defined in claim 1 wherein said liquid medium is selected from the group consisting of benzene, toluene and xylene.

18. A process as defined in claim 17 wherein said liquid medium is toluene.

19. A process as defined in claim 12 wherein said aromatic solvent is toluene.

* * * * *